(12) United States Patent
Shoemaker

(10) Patent No.: US 11,323,885 B1
(45) Date of Patent: May 3, 2022

(54) SYSTEMS AND METHODS FOR PERMITTING ACCESS TO A PARTY USING A DECENTRALIZED IDENTITY

(71) Applicant: Identity Technologies, Inc., San Diego, CA (US)

(72) Inventor: Phillip Shoemaker, San Diego, CA (US)

(73) Assignee: Identity Technologies, Inc., San Diego, CA (US)

( * ) Notice: Subject to any disclaimer, the term of this patent is extended or adjusted under 35 U.S.C. 154(b) by 0 days.

(21) Appl. No.: 17/562,717

(22) Filed: Dec. 27, 2021

(51) Int. Cl.
*H04W 12/69* (2021.01)
*H04W 8/26* (2009.01)
*H04W 4/14* (2009.01)
*H04W 48/16* (2009.01)
*H04W 48/18* (2009.01)

(52) U.S. Cl.
CPC .............. *H04W 12/69* (2021.01); *H04W 4/14* (2013.01); *H04W 8/26* (2013.01); *H04W 48/16* (2013.01); *H04W 48/18* (2013.01)

(58) Field of Classification Search
CPC ......... H04W 12/69; H04W 4/14; H04W 8/26; H04W 48/16; H04W 48/18
See application file for complete search history.

(56) References Cited

U.S. PATENT DOCUMENTS 10,681,041 B2 * 6/2020 Harding .................. G06F 21/32
11,153,070 B2 * 10/2021 Fazzone .............. H04W 12/108

* cited by examiner

*Primary Examiner* — Wayne H Cai
(74) *Attorney, Agent, or Firm* — Foley & Lardner LLP

(57) ABSTRACT

Methods and systems are provided for controlling access to communications with a party using a decentralized identity. A device may receive biometric information of a user, and retrieve, using the biometric information of the user, a first communication address associated with the user. The device may transmit, via the first communication address, a request to communicate with the user; and may receive, from a second device associated with the user, an identification of a second communication address controlled by the user. The device may utilize the second communication address to transmit at least one item of information to the second device associated with the user.

20 Claims, 13 Drawing Sheets

SYSTEMS AND METHODS FOR PERMITTING ACCESS TO A PARTY USING A DECENTRALIZED IDENTITY

TECHNICAL FIELD

The present disclosure generally relates to systems and methods for identity management systems. In particular, the present disclosure relates to systems and methods for permitting access to a party using a decentralized identity.

BACKGROUND

Most identity management systems are in large, centralized databases or server repositories that are centrally managed. Such centralized databases or server repositories may represent a single point of trust, and a single point of failure. All participants in a system that relies on such centralized databases should place a high level of trust in a correct operation and accuracy of data stored in the centralized databases. Additionally, malicious actors have a centralized point on which to focus an attack, and a security breach or leak has significant scale and impact. Centralized security services typically require users' sensitive and secret data, including secret keys and passwords, to be stored in repositories. Even when hashed or encrypted for security, most people do not have strong passwords, and existing breaches can be used to discover hashed passwords and keys.

Centralized identity management systems, i.e., those that store a user's explicit identifying attributes and associated sensitive security credentials centrally, may have infrastructural limitation leading to data security/privacy issues and anonymity of users or of their data. Such centralized identity management systems may be susceptible to identity theft threats that may collect personal data associated with the user, and share this data with a third party in unauthorized ways without user consent. For example, collected data associated with the user, such as a phone number and email address of the user, can be shared with a consumer intelligence and consumer behavior analytics companies without user consent.

In a blockchain, which is a peer-to-peer network also known as a distributed ledger, data records can be held securely and yet openly authenticated, referenced, and documented so that data can be trusted as reliable. A blockchain may represent an archive of data and transactions that are performed in a data processing system.

In a blockchain, fraudulent transactions are quickly identified and discarded. Attempting to add fraudulent transaction is expensive, entails foregoing the financial incentives for acting honestly, and is highly unlikely to succeed because no single party in the overall network has more than a small proportion of the overall 'authority' required to validate transactions. In practice, it is simpler and more profitable to act honestly. Because the blockchain is maintained by a large network of participants, no one actor can easily gain enough influence to submit a fraudulent transaction or successfully alter recorded data (although possible in theory with enough resources, it would be prohibitively expensive in practice). Any change that a party attempts to make to the blockchain is recognized and rejected by the majority. Thus, the blockchain provides a secure system to store data records in a transparent manner.

The blockchain may be implemented by various industries for storing records and data. In one example, the blockchain can be implemented in an event management industry where guests' records can be stored. In another example, the blockchain can be implemented in a production industry where records associated with each step of production can be stored, and a participant involved at each respective production step may be given access to the stored data. In yet another example, the blockchain can be implemented for identity database management, where user identity related information can be stored, and the user may be given control on who may access the user identity related information and by which means they may access it.

SUMMARY

The present disclosure generally relates to systems and methods for identity management systems. In particular, the present disclosure relates to systems and methods for permitting access to a party using a decentralized identity.

Systems and method are provided for an identity management system. In an example embodiment, a method for controlled access to communications systems is described. The method is carried out by a data accessing party device. The method includes receiving biometric information of a user, retrieving a first communication address associated with the user using the biometric information of the user, transmitting via the first communication address a request to communicate with the user, receiving from a second device associated with the user, an identification of a second communication address controlled by the user, and utilizing the second communication address to transmit at least one item of information to the second device associated with the user.

In some embodiments, the first communication address comprises a decentralized identity address.

In some embodiments, transmitting the request to communicate with the user further comprises transmitting a self-sovereign identity (SSI) message via the decentralized identity address.

In some embodiments, the first communication address comprises a short message service (SMS) address.

In some embodiments, the second communication address further comprises a decentralized identity address, an email address, or a phone number.

In some embodiments, the second communication address comprises an address of a third device configured to forward communications to the second device associated with the user.

In some embodiments, the third device is subsequently configured to stop forwarding communications to the second device associated with the user.

In some embodiments, receiving the identification of the second communication address further comprises receiving an identification of one of an access timer or an access condition, and the third device is subsequently configured to stop forwarding communications to the second device responsive to expiration of the access timer or satisfaction of the access condition.

In some embodiments, the method further comprises determining whether the received biometric information matches biometric information stored in a database, retrieving the address of the decentralized identity associated with the user from the database responsive to determining the received biometric information matches biometric information of the user in the database, or requesting the address of the decentralized identity associated with the user from the second device responsive to determining the received biometric information does not match any biometric information in the database.

In some embodiments, the request to communicate with the user comprises an identifier of the device or an entity associated with the device.

In another example embodiment, a second method for controlled access to information is described. The second method is carried out by a data owning party device. The second method includes receiving from a requesting device a request to send information to the user the request communicated via a decentralized identity associated with the user corresponding to biometric information of the user received by the requesting device, determining to grant communications access to the requesting device, and responsive to the determination transmitting to the requesting device an identification of a second communication address controlled by the user the requesting device using the second communication address to transmit at least one item of information to the device of the user or a second device associated with the user.

In some embodiments, determining to grant communications access to the requesting device further comprises selecting an address of a third device configured to forward communications to the second device associated with the user, transmitting to the requesting device the address of the third device, and receiving the at least one item of information, transmitted by the second device and forwarded via the third device.

In some embodiments, the request to send information to the user further comprises at least one access condition, and determining to grant communications access to the requesting device is based on the at least one access condition.

In a further example embodiment, a system for accessing information is described. The system includes one or more processors and a communications interface, and the one or more processors are configured to receive biometric information of a user, retrieve using the biometric information of the user a first communication address associated with the user, transmit via the communications interface using the first communication address a request to communicate with the user, receive via the communications interface from a second device associated with the user an identification of a second communication address controlled by the user, and transmit using the second communication address at least one item of information to the second device associated with the user.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
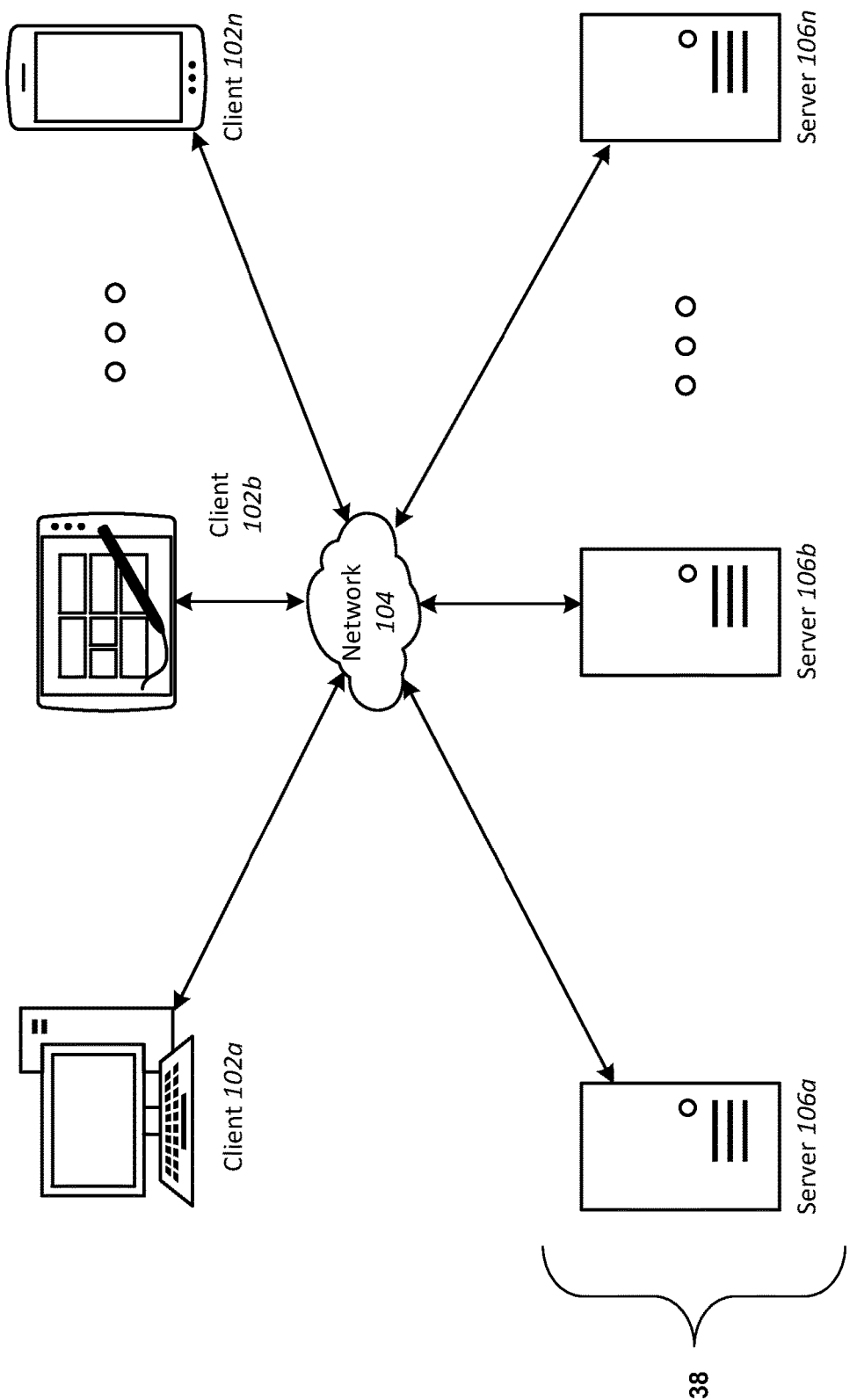
FIG. 1A is a block diagram depicting an embodiment of a network environment comprising client devices in communication with server devices, according to some embodiments.

In various embodiments of the disclosure, non-limiting definitions of one or more terms that will be used in the document are provided below.

A term "Application Programming Interface (API)" may refer to a connection between computers or between computer programs. An Application Programming Interface is a type of software interface offering a service to other pieces of computer programs.

A term "Biometric data" may refer to measurements and calculations relating to human characteristics which may be collected and stored for the purpose of identification. Examples of biometric data include a facial imprint and a thumb/fingerprint.

A term "centralized or distributed digital ledger" may refer to a digital ledger of information and who owns that information. The term is interchangeably used as centralized digital ledger or distributed digital ledger or digital ledger or distributed ledger. A centralized digital ledger is stored completely at a single centralized location and a distributed digital ledger is stored in a distributed format across many locations. An example of a distributed digital ledger is a blockchain.

A term "data accessing party" may refer to a party which wishes to access a second party or data owned by the second party. In examples, the data accessing party may have collected biometric data from the second party. In examples, the second party is a data owning party.

A term "data owning party" may refer to a party whose identity related information a second party wishes to access. In examples, the second party is a data accessing party.

A term "decentralized identity" may refer to a record of personal information that is stored securely in a decentralized digital ledger.

A term "identifying information" may refer to information provided by the data accessing party or by a third party managed by the data accessing party which identifies the providing party to the recipient. Examples of identifying information include a URL to a corporate web site and a registered company name and address.

A term "self-sovereign identity", abbreviated to SSI, may refer to a unique identifier relating to a decentralized identity.

A term "self-sovereign identity message", abbreviated to SSIM, may refer to a secure message which is directed to or from a self-sovereign identity.

A term "service" may refer to a service which may have access managed by the use of biometric data.

A term "space" may refer to an area which requires biometric data to enter or within which biometric data may be gathered. In examples, a space may be a physical space such as a room or building and in other examples, a space may be a virtual space such as a website or an online account.

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods to provide an identity management system that allows a user and data accessing party to access a centralized or distributed ledger over a network.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g., Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and Ipv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open-source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open-source product whose development is overseen by Docker, Inc. of San Francisco, Calif.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
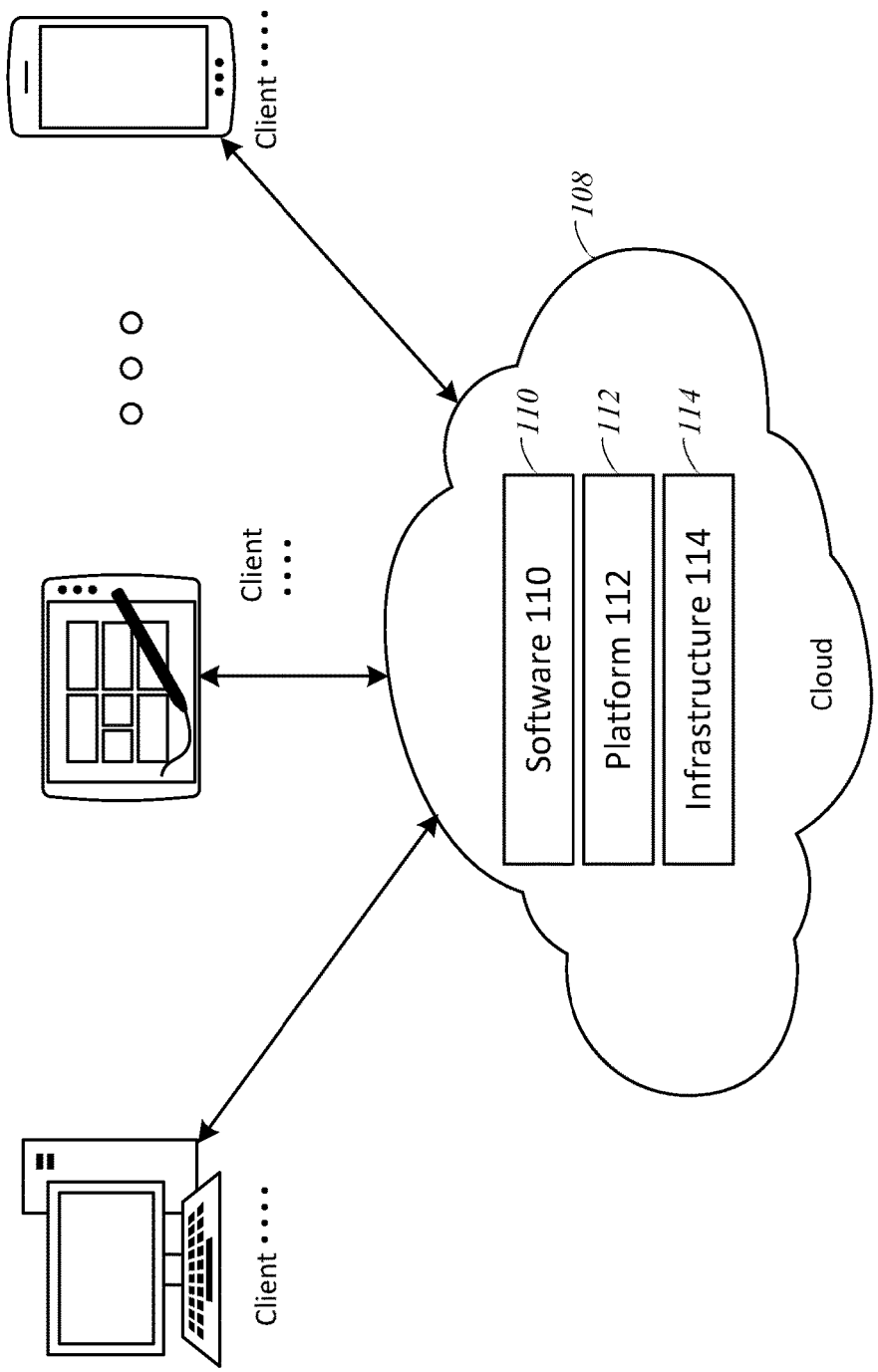
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back-end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization, or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g., Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g., Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
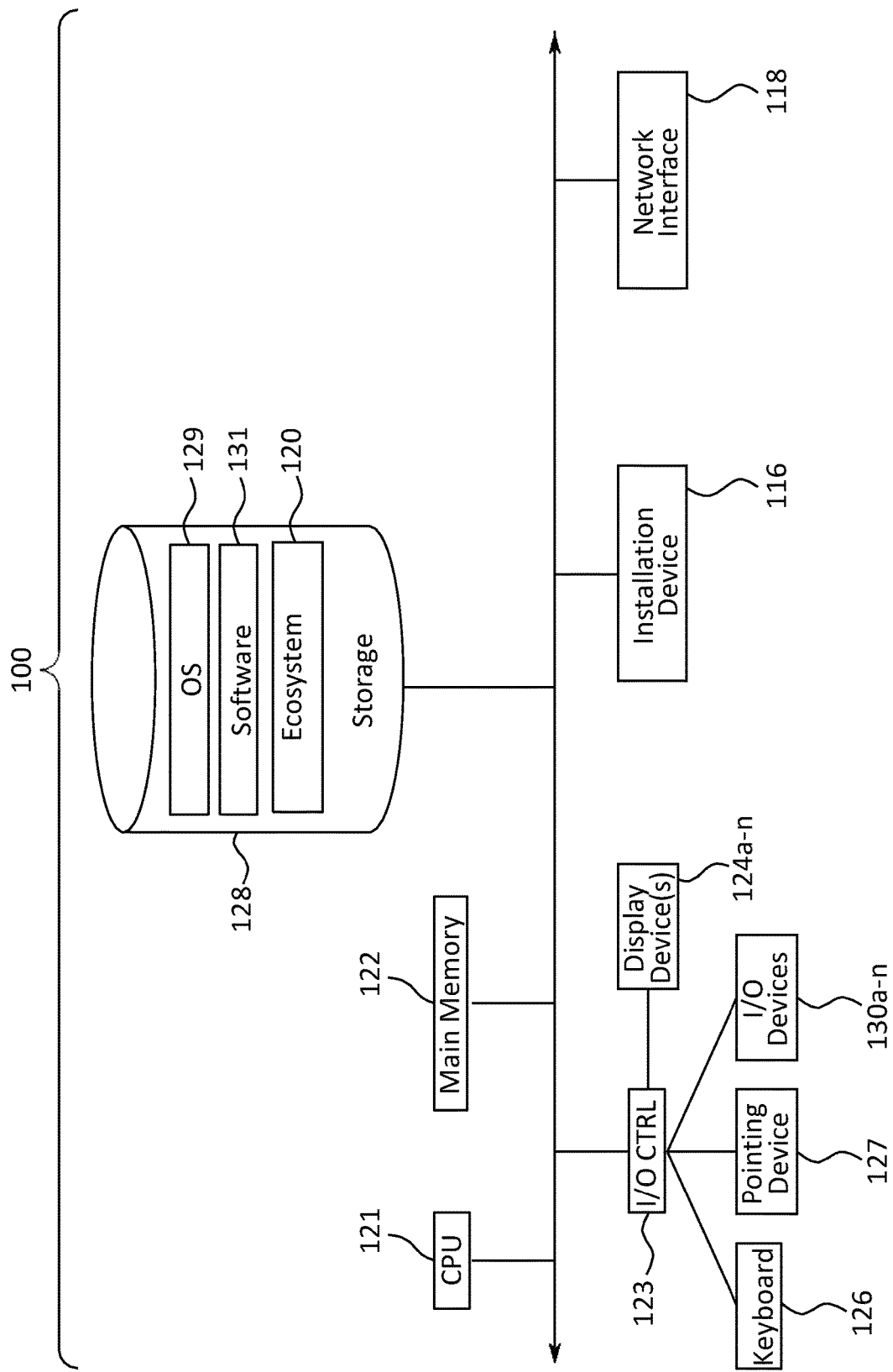
FIG. 1C and FIG. 1D are block diagrams depicting embodiments of computing devices useful in connection with the methods and systems described herein, according to some embodiments.
Figure 1D:
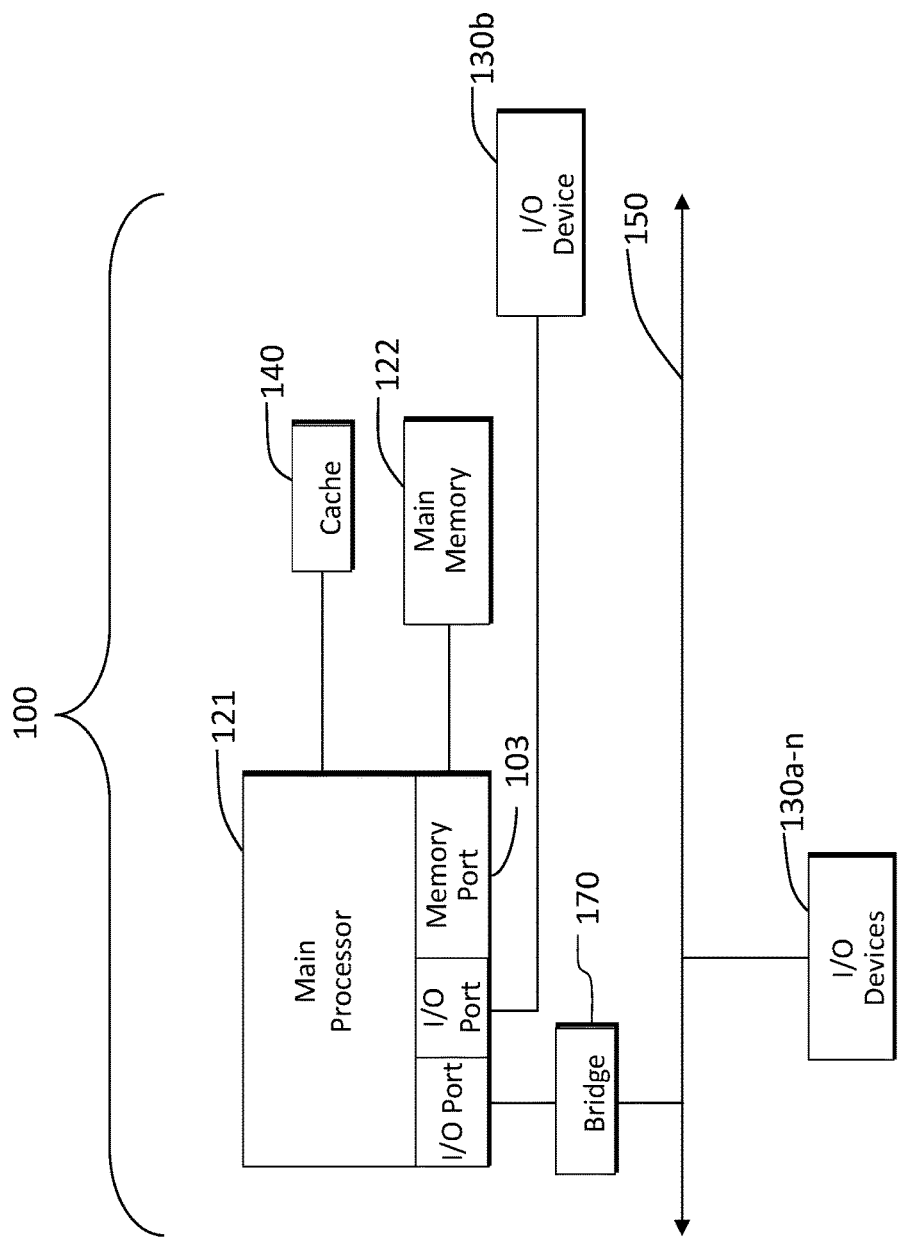

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of ecosystem 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect, or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g., one or more hard disk drives or redundant arrays of independent disks) for storing an operating system or other related software, and for storing application software programs such as any program related to ecosystem 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOWS 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. Of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g., the IPAD line of devices by Apple; GALAXY TAB family of devices by Samsung; or KINDLE FIRE, by Amazon.com, Inc. of Seattle, Wash. In other embodiments, computing device 100 is an eBook reader, e.g., the KINDLE family of devices by Amazon.com, or NOOK family of devices by Barnes & Noble, Inc. of New York City, N.Y.

In some embodiments, communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g., a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. An Identity Management System that Allows a User and Data Accessing Party to Access a Centralized or Distributed Ledger Over a Network The following describes systems and methods for providing an identity management system that allows a party to access contact-related information stored in a distributed ledger over a network.

The systems and methods of the present disclosure employ a centralized or distributed ledger for storing user's identity related information. One example of centralized or distributed ledger is a blockchain that allows users to create and manage decentralized digital identities. The decentralized digital identity may be interchangeably referred to as decentralized identity or self-sovereign identity (SSI). A user may receive identity related credentials from a number of issuers, i.e., government, employer, educational institutes, and may store these credentials in a digital wallet. These credentials may further be presented to any relevant identity issuing authority that issues the decentralized identity. Examples of identity credentials may include, but may not be limited to, passport, driver license, national identity card, and social security number. The decentralized identities may be stored on decentralized identity storage. In one example, the decentralized identity storage is a user's device (i.e., smartphone, laptop, etc.).

The systems and methods of the present disclosure enable a user (user may be used interchangeably to refer to data owning party) to store the decentralized identity in centralized or distributed ledger. In one implementation, the decentralized data may be secured by a cryptographic process. In an example, a public key infrastructure (PKI) may be used. PKI required the generation of a related pair of keys called a public key and a private key. The private key may be known only to the user and the public key may be known to the public and may be distributed by the owner of the private key for the purpose of securing the decentralized data. The PKI using a combination of private key and public key can be used to store and access the decentralized data without compromising the security of the decentralized data. As the private key is owned and controlled by the user, to gain access to the user's information, permission from the user is mandatory.

Figure 2A:
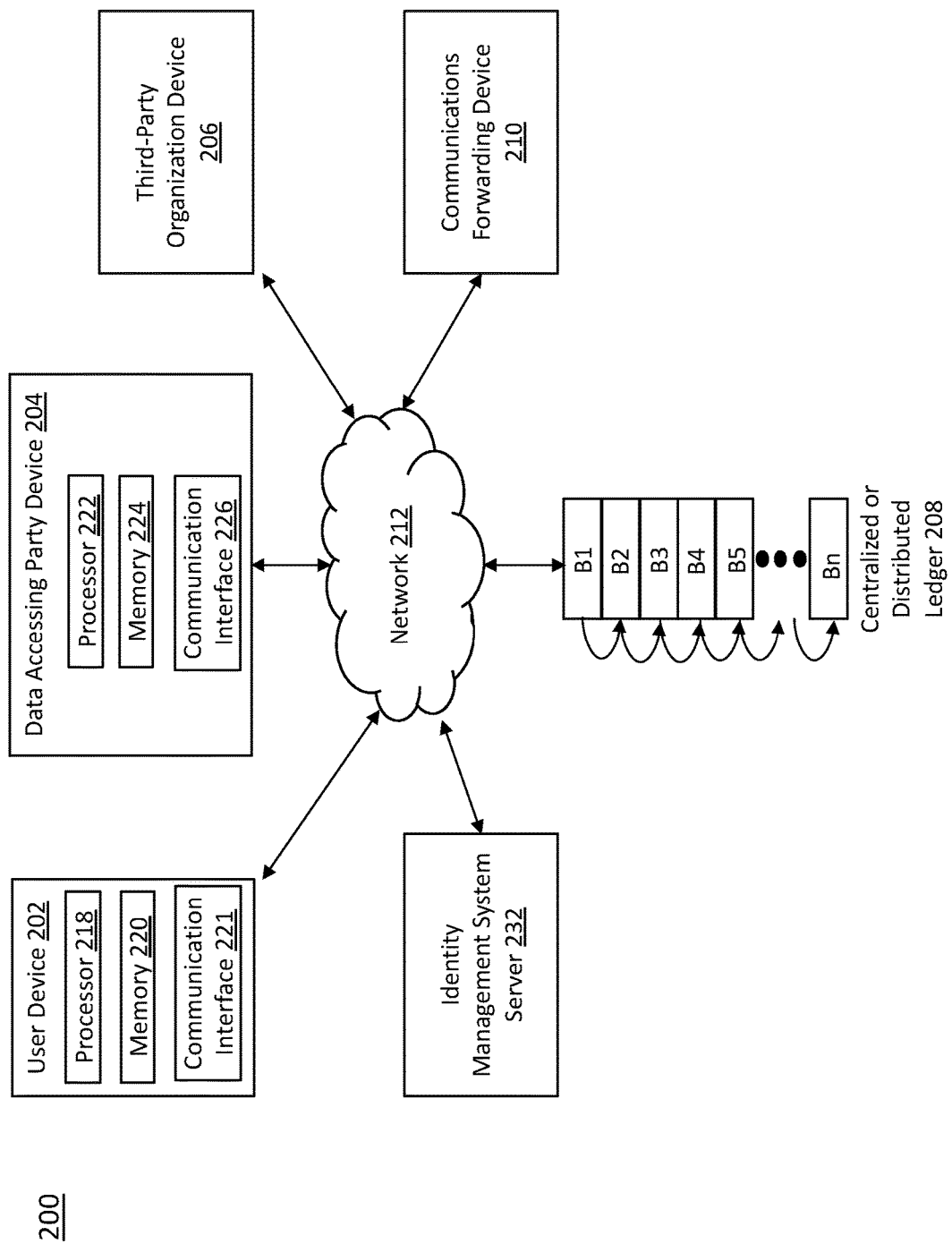
FIG. 2A illustrates an implementation of some of an architecture of system for providing an information management system, according to some embodiments.

FIG. 2A depicts an implementation of some of an architecture of system 200 for providing an information management system that allows any one of user, data accessing party or third-party organization to access a centralized or distributed ledger over a network, according to some embodiments. As shown in FIG. 2A, system 200 may interconnect a plurality of components such as devices, systems, components, resources, facilities, and the like in communication with one another via network 212.

System 200 may include user device 202, data accessing party device 204, third-party organization device 206, centralized or distributed ledger 208, communications forwarding device 210, identity management system server 232, and network 212, enabling communication between the system components for information exchange. Network 212 may be an example or instance of a cloud computing environment implemented on one or more clients 102a-102n, establishing communication between the clients 102a-102n and cloud 108 over one or more networks 104, details of which are provided with reference to FIG. 1A and its accompanying description. In an example, network 212 may be a secured network or highly distributed network.

User device 202 may correspond to any computing device used by a user. In some embodiments, user device 202 may be a computing device controlled by an individual or an organization that wants to create or control a decentralized identity. User device 202 may be any computing device, such as a desktop computer, a laptop, a tablet computer, a mobile device, a Personal Digital Assistant (PDA) or any other computing device. In an implementation, user device 202 may be a device, such as client device 102 shown in FIG. 1A and FIG. 1B. User device 202 may be implemented by a device, such as computing device 100 shown in FIG. 1C and FIG. 1D. According to some embodiments, user device 202 may include processor 218, memory 220, and communication interface 221. In an example, processor 218 and memory 220 of user device 202 may be CPU 121 and main memory 122, respectively, as shown in FIG. 1C and FIG. 1D. User device 202 may also include user interface devices such as a keyboard, a mouse, a touch screen, a haptic sensor, voice-based input unit, or any other appropriate user interface. It shall be appreciated that such user interface devices of user device 202 may correspond to similar user interface devices of computing device 100 in FIG. 1C and FIG. 1D, such as keyboard 126, pointing device 127, and I/O devices 130a-n. User device 202 may also include display devices, such as a screen, a monitor connected to the device in any manner, or any other appropriate display. It shall be appreciated that such display devices of user device 202 may correspond to similar display devices of computing device 100 in FIG. 1C and FIG. 1D, such as display devices 124a-n. In an implementation, user device 202 may display received content for the user using a display device and is able to accept user interaction via a user interface device responsive to the displayed content. In some embodiments, communication interface 221 may be implemented to allow computer instructions and data to be transferred between user device 202 and identity management system server 232. Communication interface 221 may implement industry promulgated protocol standards, such as Ethernet IEEE 802.3, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Data accessing party device 204 may correspond to any computing device used by a data accessing party. In one or more embodiments, the data accessing party may correspond to a second user, a trusted organization, a person, a computer-implemented algorithm, a centralized or a decentralized computing system, and the like. For example, the data accessing party may represent a gaming center, casino, shopping mall, sports complex, invite-only service centers, restricted offices and the like. The data accessing party may also control a space and may require credentials of a user to authorize the user to enter the space. According to some embodiments, data accessing party device 204 may include processor 222, memory 224, and communication interface 226. In an example, processor 222 and memory 224 of data accessing party device 204 may be CPU 121 and main memory 122, respectively, as shown in FIG. 1C and FIG. 1D. In some embodiments, communication interface 226 may be implemented to allow computer instructions and data to be transferred between data accessing party device 204, identity management system server 232, and centralized or distributed ledger 208. Communication interface 226 may implement industry promulgated protocol standards, such as Ethernet IEEE 802.3, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Third-party organization device 206 may correspond to any computing device used by a third-party organization. Third-party organization may correspond to a trusted organization, a person, a computer-implemented algorithm, a centralized or a decentralized computing system, and the like. In an embodiment, third-party organization may be a trusted organization which, upon receiving such instructions from the data accessing party, may be required to validate the credentials of the user under a control of the data accessing party.

Communications forwarding device 210 may correspond to a computing device configured to forward communications from one device to another device. In an example, communications may be any form of electronic communications message such as email, short message service (SMS) message, instant messaging (IM) message, or voice message. In an example, communication forwarding device 210 may be configured with the addresses of two devices and it may forward communications which are addressed to the first device to the address of the second device. In an implementation, communication forwarding device 210 may be capable of forwarding communications for a plurality of users and a plurality of forwarding configurations simultaneously.

Identity management system server 232 may correspond to a computing device which manages access to user contact data for a purpose.

According to aspects of the present disclosure, data accessing party device 204, third-party organization device 206, identity management system server 232, and communication forwarding device 210 may be servers or computing devices owned or managed or otherwise associated with an organization or any entity authorized thereof. According to some embodiments, data accessing party device 204, third-party organization device 206, identity management system server 232, and communication forwarding device 210 may be implemented in a variety of computing systems, such as a mainframe computer, a server, a network server, a laptop computer, a desktop computer, a notebook, a workstation, and any other computing system. In an implementation, data accessing party device 204, third-party organization device 206, identity management system server 232, and communication forwarding device 210 may be implemented in a server, such as server 106 shown in FIG. 1A. In some implementations, data accessing party device 204, third-party organization device 206, identity management system server 232, and communication forwarding device 210 may be implemented by a device, such as computing device 100 shown in FIG. 1C and FIG. 1D. In some embodiments, data accessing party device 204, third-party organization device 206, identity management system server 232, and communication forwarding device 210 may be implemented as a part of a cluster of servers. In some embodiments, data accessing party device 204, third-party organization device 206, identity management system server 232, and communication forwarding device 210 may be implemented across a plurality of servers, thereby, tasks performed by data accessing party device 204, third-party organization device 206, identity management system server 232, and communication forwarding device 210 may be performed by the plurality of servers. These tasks may be allocated among the cluster of servers by an application, a service, a daemon, a routine, or other executable logic for task allocation.

According to an implementation, centralized or distributed ledger 208 may refer to a digital record of who-owns-what. One or more participants of system 200 may have access to centralized or distributed ledger 208. Centralized or distributed ledger 208 may be an electronic ledger that includes a list of verified identity related data, which may include contact information, in the form of records. In an example, centralized or distributed ledger 208 is a distributed ledger referred to as a blockchain which is used to store decentralized identities. Identity related credentials associated with a user may be stored as a decentralized identity in centralized or distributed ledger 208 at an address or in an account of the user and may be protected by a private key controlled by the user. In examples, one or more of the address, the account and the private key relating to the decentralized identity may be stored in a digital wallet. The user herein may be the data owning party or the owner of record. The account may be a specific location in the centralized or distributed ledger where the user's identity related information may be stored. Part or all of centralized or distributed ledger 208 may be downloaded or cached by any of the participants in system 200 for offline use. Any participant may download centralized or distributed ledger 208 on a periodic basis when they are connected online. Centralized or distributed ledger 208 may be delivered on a periodic or one-time basis to the one or more participants via electronic mail, file transfer protocol, postal mail, delivery service, or private delivery channels operated by the respective participants. Centralized or distributed ledger 208 may be accessed from a cached offline store.

Referring back to general description of the present disclosure, in a broader view, it is described that the data accessing party may require the validation of identity credentials of the user to allow entry to a space. The data accessing party may also wish to contact the user for a purpose, e.g., marketing. The user may have identity related information in the centralized or distributed ledger and the identity related information may include contact information of the user. The data access party may request the user to allow access to some or all of the identity related information, which may include the contact information of the user.

Figure 2B:
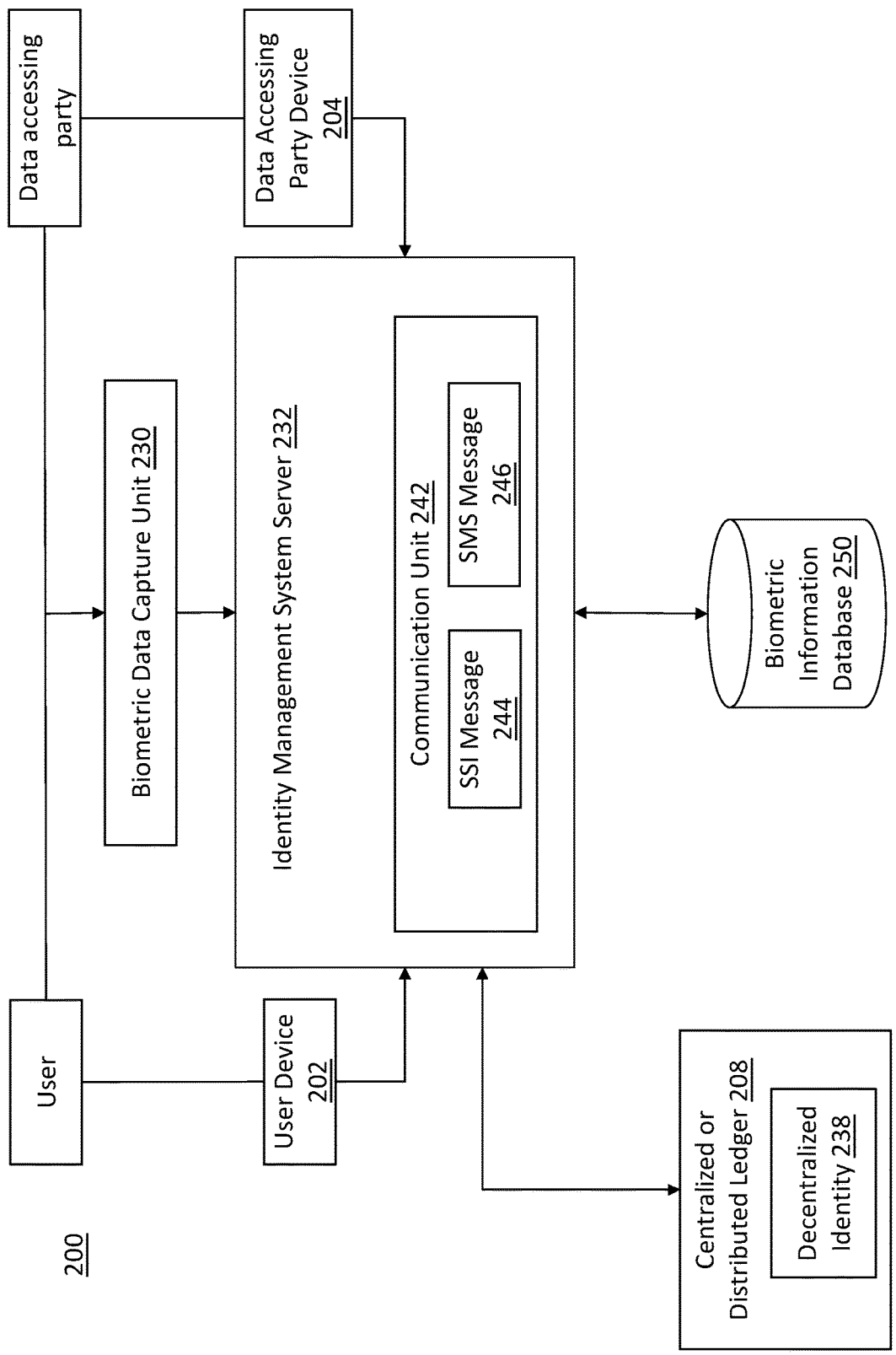
FIG. 2B illustrates a generic block diagram of system for providing an information management system, according to some embodiments.

FIG. 2B illustrates one or more system components of an identity management system 200, as described in FIG. 2A, in accordance with some embodiments. The identity management system 200 may enable the user and the data accessing party to be connected to identity management system server 232 through user device 202 and data accessing party device 204, respectively. In one or more embodiments, the data accessing party may have access to biometric data capture unit 230 which is communicatively coupled to identity management system server 232 and may be used to capture biometric data from user. For example, the data accessing party may have access and control over a set of CCTV cameras implemented within a space. Biometric data capture unit 230, configured to capture biometric data of the user, may transfer captured biometric data to identity management system server 232 upon receiving instructions from the user or the data accessing party. Identity management system server 232 may be configured to access centralized or distributed ledger 208 and biometric information database 250, and may implement communication unit 242. Biometric information database 250 may be provided to store data gathered from the user including biometric data received from the biometric data capture unit 230 and other identity related information that may be provided by user. Centralized or distributed ledger 208 may be provided to store decentralized identity related information received from user device 202 (decentralized identity 238) and data accessing party unit 204. Although shown separately, in an embodiment, biometric information database 250 may be implemented by identity management system server 232.

With reference to FIG. 2A, identity management system server 232 may be connected with user device 202 and data accessing device 204 via network 212. Returning to FIG. 2B, the user may be enabled to access centralized or distributed ledger 208 through user device 202. The data accessing party may be enabled to access centralized or distributed ledger 208 and biometric information database 250 through data accessing party device 204.

In one or more embodiments, user (i.e., data owning party) may enter into the space owned or controlled by data accessing party, either online (i.e., through weblink) or offline (i.e., in person). For example, user may enter a casino or may access a gaming web site provided by data accessing party. The data accessing party may require identification data from the user, for example, biometric data (i.e., face imprint or fingerprint of the user) for identity verification purpose. The biometric data, in some implementations, may be captured by biometric data capture unit 230. The biometric data capture unit 230 may include one or more imaging devices, such as a camera for capturing identity photos, a security camera, or a fingerprint scanning device. In one scenario, the user may be aware of the biometric capture process. For example, the user may be required to provide biometric data as a condition to access the service or to enter the space. In another example, the user may be required to scan a fingerprint before entering into the space. In another scenario, the user may not be aware of the biometric capture process. For example, a facial imprint of the user may be captured using a security camera. In some embodiments, the data accessing capture unit may be controlled and operated by the data accessing party. For example, a security camera network installed within the space may be owned and controlled by the data accessing party. In one implementation, the user may have access to the biometric capture unit, for example fingerprint scanner. In another implementation, the user may not have access over biometric capture unit, for example, a CCTV camera.

According to some embodiments, identity management system server 232 is configured to access centralized or distributed ledger 208 and biometric information database 250. The user and the data accessing party both may have their own decentralized identity accounts, i.e., an identity associated with a digital wallet, and the credentials of the user or the data accessing party need to be verified before accessing centralized or distributed ledger 208. The owner of the decentralized identity account may be required to provide security credentials through user device 202 or data accessing party device 204 to access the centralized or distributed ledger 208. With each account a digital wallet is associated. In the digital wallet the identity credentials or the decentralized identity of an account holder may be stored. The account holder may have stored biometric information in biometric information database 250 and decentralized identity in centralized or distributed ledger 208.

Referring back to FIG. 2B, the biometric data, captured by the data accessing party and associated with the user may be stored in a biometric information database 250 associated with the data accessing party. In some implementations, the user may have provided identify related information in the form of a decentralized identity or a traditional identity and may have provided contact information (e.g., email address, phone number, etc.). In an embodiment, the identify related information and contact information may be stored by biometric information database 250 and linked to the user's biometric data. In other embodiments, contact information of the user is contained within the user's decentralized identity which is stored in centralized or distributed ledger 208.

User device 202 and data accessing party device 204 may include processor(s), memory, and communication interface to establish communication with the identity management system server 232. Communication unit 242 is provided to enable communication between the user and the data accessing party via SSI message 244, where a decentralized identity is to be accessed. Furthermore, SMS message 246 may be used when a decentralized identity is not available. Other communications mechanism may also be used by communications unit 242.

In one or more embodiments, the data accessing party may request access to the decentralized identity or to information contained within the decentralized identity. In an embodiment, communication unit 242 may be controlled to request access to the decentralized identity or to information contained within the decentralized identity. In some examples, the request for access is made via self-sovereign identity (SSI) message 244 and in other examples the request for access is made via short message service (SMS) message 246. Other examples of communication may also be envisaged. In some examples, the data accessing party may request access to specific information. In other examples, the data accessing party may request access to contact information. In a further example, the data accessing party may request access to all information. When the data accessing party requests access to the decentralized identity or information contained within the decentralized identity, it may identify a purpose for which that access is required. For example, the identified purpose may be marketing. For this purpose, the data accessing party may request access to contact information contained within the user's decentralized identity, for example, the user's phone number or email address, to allow the data accessing party to provide marketing offers or incentives to the user.

In examples, the data accessing party may provide identifying information when it requests access to information which may be presented to the user. Examples of identifying information are a URL to a corporate web site or a registered company name and address.

In some implementations, the data accessing party may request access to the decentralized identity or information in the decentralized identity via an Application Programming Interface (API).

A second data accessing party (not shown in figure) may be associated with the data accessing party. For example the second data accessing party may be an affiliate of or a marketing partner of the data accessing party. In an examples, the data accessing party may wish to provide to the second data accessing party the decentralized identity or information contained within the decentralized identity provided to the data accessing party. In an example, the identity of the second data accessing party may be provided during the request for information. For example, an affiliated restaurant to a gaming resort may wish to offer discounted meals to the user whilst the user is in the resort in exchange for access to the user's contact information. In this example, the restaurant, i.e., the second data accessing party, may share identification information with the user, such as its website, information brochure, or any information that can identify the restaurant.

The user may grant a permission to communicate only via the decentralized identity via SSI message. In this case, the user may not be required to grant access to any other information on forms of communication, such as email, cell phone, or mailing address.

When a data accessing party makes a request for access to information in the decentralized identity, it may provide bounds of timescale over which it is requesting access. For example, the data accessing party may request access to an email address for the duration of the data owning party's stay in a resort. In an example, the data accessing party may request unbounded access to information.

In one or more embodiments, when the data accessing party makes a request for access to information in the decentralized identity, it may provide information on an incentive or incentives that the data accessing party is offering in exchange for the information that has been requested. For example, a gaming resort owner (acting as the data accessing party) may offer a discount at a restaurant in the resort (acting as the second data accessing party) in exchange for an email address and permission to communicate with a user (acting as the data owning party). In an example, the data accessing party provides information on the second data accessing party and the incentive(s) on offer directly via the decentralized identity, via email, via SMS message or via Instant Messaging (IM) message, or any other means. In another example a URL is provided which links to a variety of offers from which a selection of one or more may be made in exchange for access to information. In further examples, different incentives may be given in exchange for different levels of access to information, for examples, greater incentives may be offered for less restricted access to information.

Referring back to FIG. 2B, as described earlier with reference to the communication unit, the data accessing party may wish to access user's information, and such information access request is made to the user through communication unit 242. According to some implementations, the user may receive a notification indicating that the data accessing party has requested access to the user's decentralized identity. In another example, the user may receive a notification indicating that the data accessing party has requested access to information contained within the user's decentralized identity. With respect to both the examples, the user may receive the notification in an application on a mobile phone that supports a digital wallet or that supports decentralized identities. The notification may identify the data accessing party, for example, by presenting the identifying information provided when access to the decentralized identity was requested, and the information that the data accessing party is requesting (for example, access to the decentralized identity, a contact email address, a contact phone number). In some examples, the notification may identify a timescale (e.g., duration or a specified time window) within which access to the information is being requested. In further examples, the notification may identify bounds of location within which the user is present for the information may be used. For example, the notification may state the bounds of location as within a block, within a city, or within a state. In some other examples, the notification may identify conditions (e.g., incentives, discounts, offer coupons, perks etc.) under which the information access request is made.

In one or more embodiments, the user may accept the request and provide access to the information which has been requested by the data accessing party. In some implementations, and in response to stated timescale, bounds of location, and conditions, the user may reject the request. In some implementations, the user may accept the request but specify their own timescale, bounds on location, or conditions on which the acceptance is conditional. In further examples, the user may specify bounds on the types of communication material that the user accepts. For example, the user may not wish to receive communication material related to alcohol or to meat products.

The response of the user is communicated back to the data accessing party, in accordance with some implementations.

In one or more embodiments, the user may grant or deny access to the decentralized identity or to information in the decentralized identity via an API.

In an embodiment, in response to user accepting the information access request and to provide access to the information which has been requested by the data access party, a second decentralized identity may be created in centralized or distributed ledger 208 by populating certain information from decentralized identity 238 for restricting scope of the information that has to be provided to the data access party. The second decentralized identity may be populated with the information which has been requested by the data accessing party. For example, if the data access party has requested e-mail address, and first decentralized identity contains email ID as well as a phone number, then the second decentralized identity may be created by populating only the email ID. In an embodiment, access to the second decentralized identity may be provided to the data access party.

In one or more embodiments, requests for information, timescales of access, bounds of locations, any other conditions of access and the response may be stored in the decentralized identity. In one or more embodiments, the user may be permitted to revoke access to information within the decentralized identity at any time. The revocation of access may be on a case-to-case basis (i.e., each grant of information may be revoked without affecting any other grant of information). In an example, once permission to access information is revoked, a message may be sent to data accessing party informing that the permission to access information is revoked. The revocation may be stored in the decentralized identity. In another example, a second decentralized identity containing the permitted contact information may be removed from centralized or distributed ledger 208.

According to one or more embodiments, the data accessing party may request access to the user's decentralized identity for the purpose of communicating with the user via the decentralized identity. Communication between the user and the data accessing party through the decentralized identity, may be established via Self-Sovereign Identity (SSI) message. SSI Message communication may be facilitated by communication unit 242.

In one or more embodiments, the decentralized identity may provide the SSI to an electronic communications platform capable of addressing its users via SSI. For example, the electronic communications platform may provide the usual features associated with electronic communications platforms, such as secure peer-to-peer messaging, transfer of images, transfer of URLs, etc.

In one or more embodiments, a request for access to communication may be made between the data accessing party and the user. In some implementations, if the user agrees to allow access to communication, then a temporary address is generated which is an alias to the user's permanent address. In an example, the temporary address may be stored in and managed by the decentralized identity. In an embodiment, both the permanent address of the user and the temporary address of the user may be provided to communications forwarding device 210 which may ensure that a message sent to the temporary address of the user is forwarded to the permanent address of the user. The temporary address may remain valid until it is revoked or removed. In examples, the temporary address may remain valid for a duration of time-bounded access to communication that has been agreed. In an example using a temporary address, it is the temporary address that is provided to the data accessing party in response to a request for contact information. In examples, the temporary address may be provided using same method steps as would be made to provide a permanent address.

In an embodiment, a request for access to communication may be made between the data accessing party and the user and, in response, a temporary email address is generated which may be alias to a permanent email address. Communications forwarding device 210 may manage communications to the temporary email address and forward to the permanent email address. In another embodiment, a request for access to communication may be made between the data accessing party and the user and, in response, a temporary phone number is generated which may be alias to a permanent phone number. Communications forwarding device 210 may manage communications such as voice, SMS messages and IM messages to the temporary phone number and forward to the permanent phone number.

In an example, the user may be permitted to revoke access to communications at any time. In an embodiment, access to communications may be revoked by instructing communications forwarding device 210 to no longer forward messages sent to the temporary address of the user to the permanent address of the user.

In one or more embodiments, temporary identifiers for other communication methods may be generated. In an example, a temporary telephone number may be provided to the data accessing party which provides an alias to a telephone number stored in the decentralized identity. In an example, messages (e.g., SMS messages, instant messages, voice messages) which sent to the temporary telephone number may be forwarded to the user for a defined time period.

In embodiments, there may be no limit on temporary addresses and communications forwarding device 210 may forward messages to many temporary addresses to a single permanent address. In an example, if one temporary email address is revoked, it may not affect the functionality of other temporary email addresses.

Figure 3A:
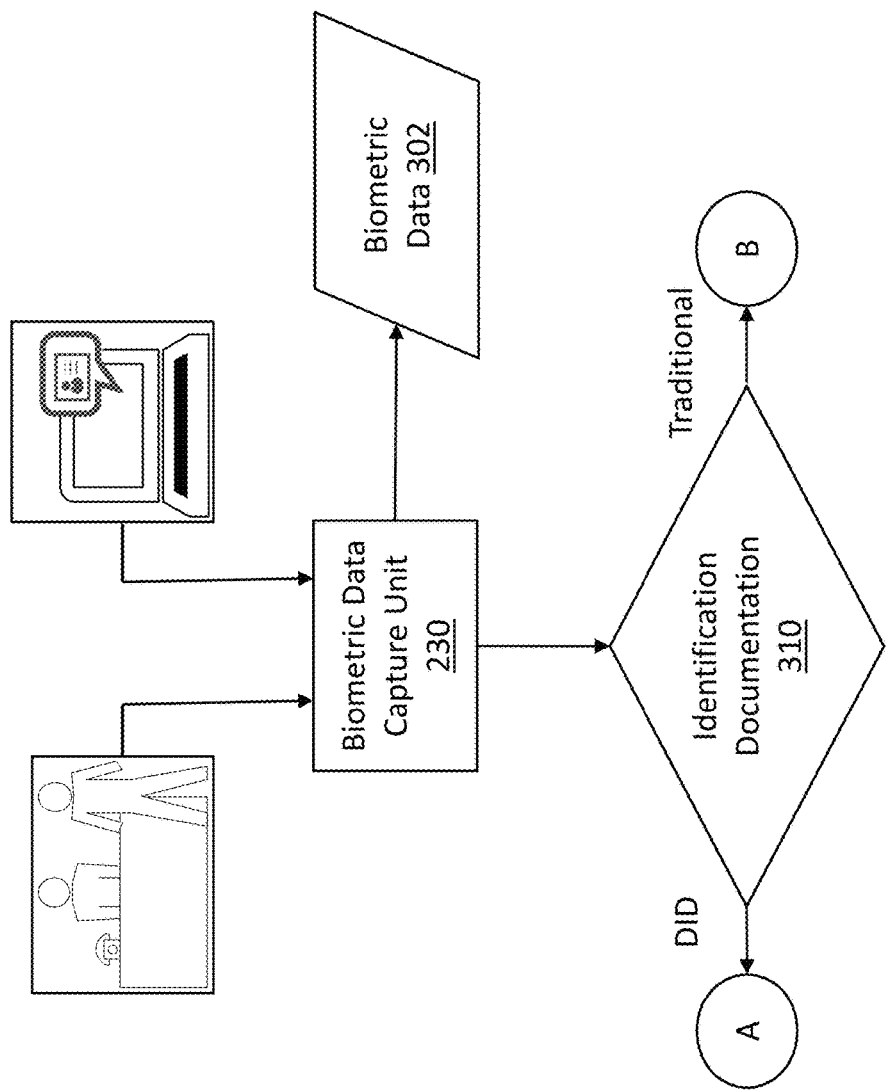
FIG. 3A and FIG. 3B describe an implementation of registering biometric information of a user along with the user's identity information in a database, according to some embodiments.
Figure 3B:
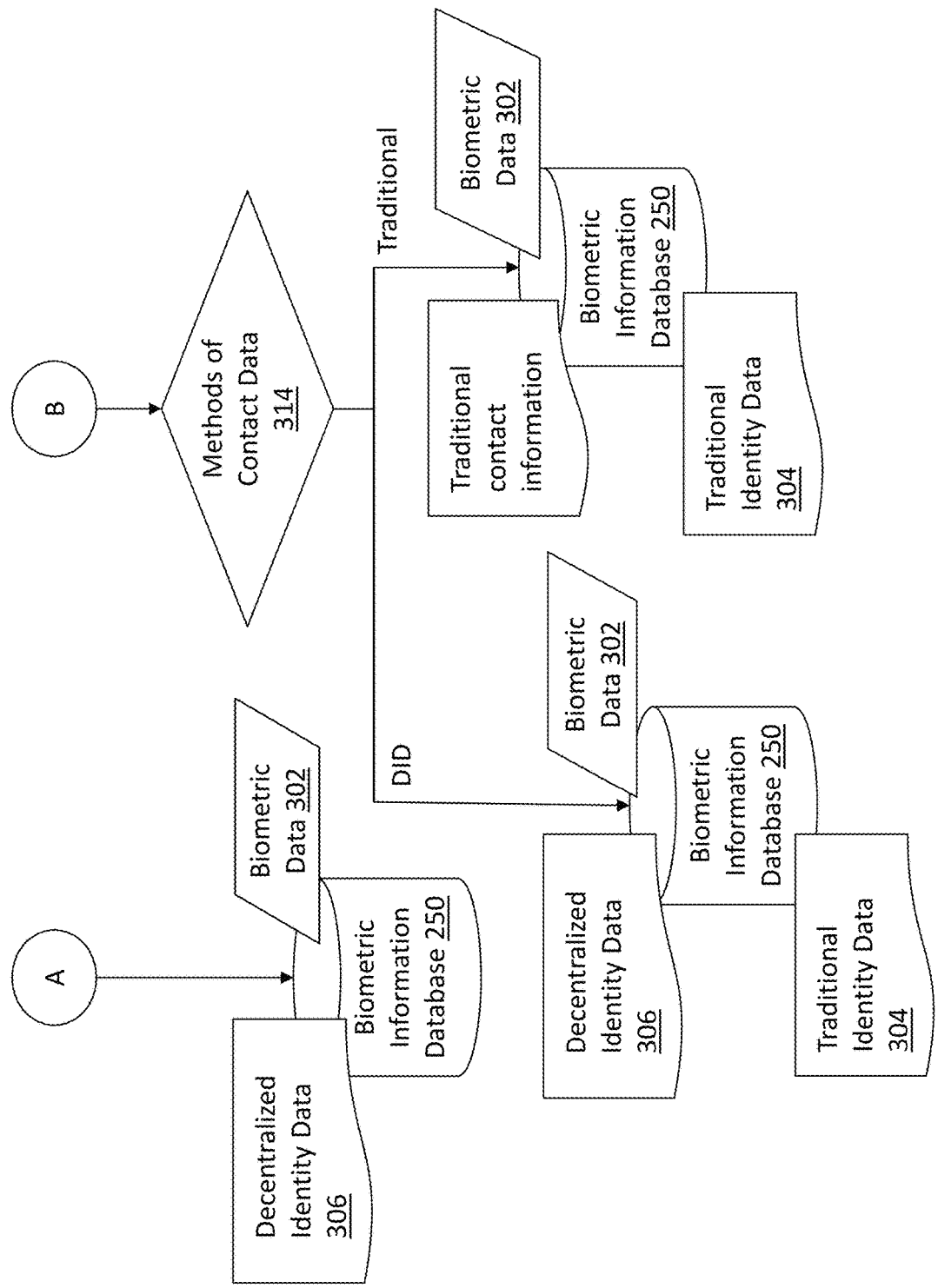

FIG. 3A and FIG. 3B describe a process 300 of registering biometric information of a user along with the user's identity information in a database, in accordance with some embodiments. The process is carried out by the components including biometric data capture unit 230 and biometric information database 250.

In a given scenario, the user may present themselves in a space and the data accessing party may capture biometric data 302 by using biometric data capture unit 230. Following the capture of biometric data 302, the user may be required to provide identity information to the data accessing party. In an example, the user may provide identity information to the data accessing party to secure access to the space. In some examples, the user may furnish decentralized identity data 306 (which may refer to decentralized identity 238 stored in centralized or distributed ledger 208) to provide identity information (via, for example, an SSI or via QR code encoding SSI). In some other examples, the user may furnish one or more traditional forms of identifications, such as a passport, a national identity card or a driver license (one or more traditional forms of identifications collectively referred to as traditional identity data 304). In some other examples, the user may furnish both decentralized identity data 306 and a traditional identity data 304. In some examples, the biometric data 302 and furnished identity information are identified at step 310. In examples, the identity information may be either a decentralized identity data 306 or traditional identity data 304.

Information provided by the user may, in examples, be verified by data accessing party and may, in other examples, be verified using the services of third-party organizations. In some implementations, biometric data 302 may be associated with identity information and contact information in a database under the control of the data accessing party. Information stored by the database could be in the form of a decentralized identity provided by user, or database records that record information contained within the traditional forms of identification and contact information not contained within a decentralized identity. In some examples, the database, under the control of data accessing party, manages the allocation of player cards to members of a casino or a gaming resort.

If captured biometric data indicates that user registered with data accessing party and user's identification information is stored in a decentralized identity database 238, the data accessing party may retrieve and validate any or all information stored in decentralized identity database 238 along with biometric data from the biometric database 236 associated with user. In some examples, the information stored in decentralized identity database 238 may be validated by third-party organization, which is a trusted organization. In some other examples, third-party organization may determine the decentralized identity information sufficiently trustworthy that no further validation of the information within decentralized identity is required. In yet other examples, the decentralized identity may be recorded in a database record in preparation to be associated with user. In some implementations, data accessing party or third-party organization may access the centralized identity through SSI.

In some implementation, user may furnish contact information to the data accessing party. Step 314 determines the form of the contact information provided. In some examples, user may provide information on a decentralized identity that contains contact details of the user (decentralized identity data 306). In this example, a method of obtaining the contact information from the decentralized identity may be recorded in biometric information database 250 along with other gathered details including biometric data 302 and traditional identity data 304. The contact information may then be access through SSI, whenever required. In other examples, data accessing party may further request other contact details via the decentralized identity as described by this disclosure. In some examples, user may provide contact information in a traditional form (i.e., not a decentralized identity), then the contact information may be recorded in a biometric information database 250 along with other gathered details including biometric data 302 and traditional identity data 304. All methods of contact information may be validated prior to recording. In one example, the method of obtaining contact information may be validated by third-party organization.

In implementation, biometric data, identification information relating to form of the identity related information, methods of obtaining the contact information are associated together in biometric information database 250.

Figure 4:
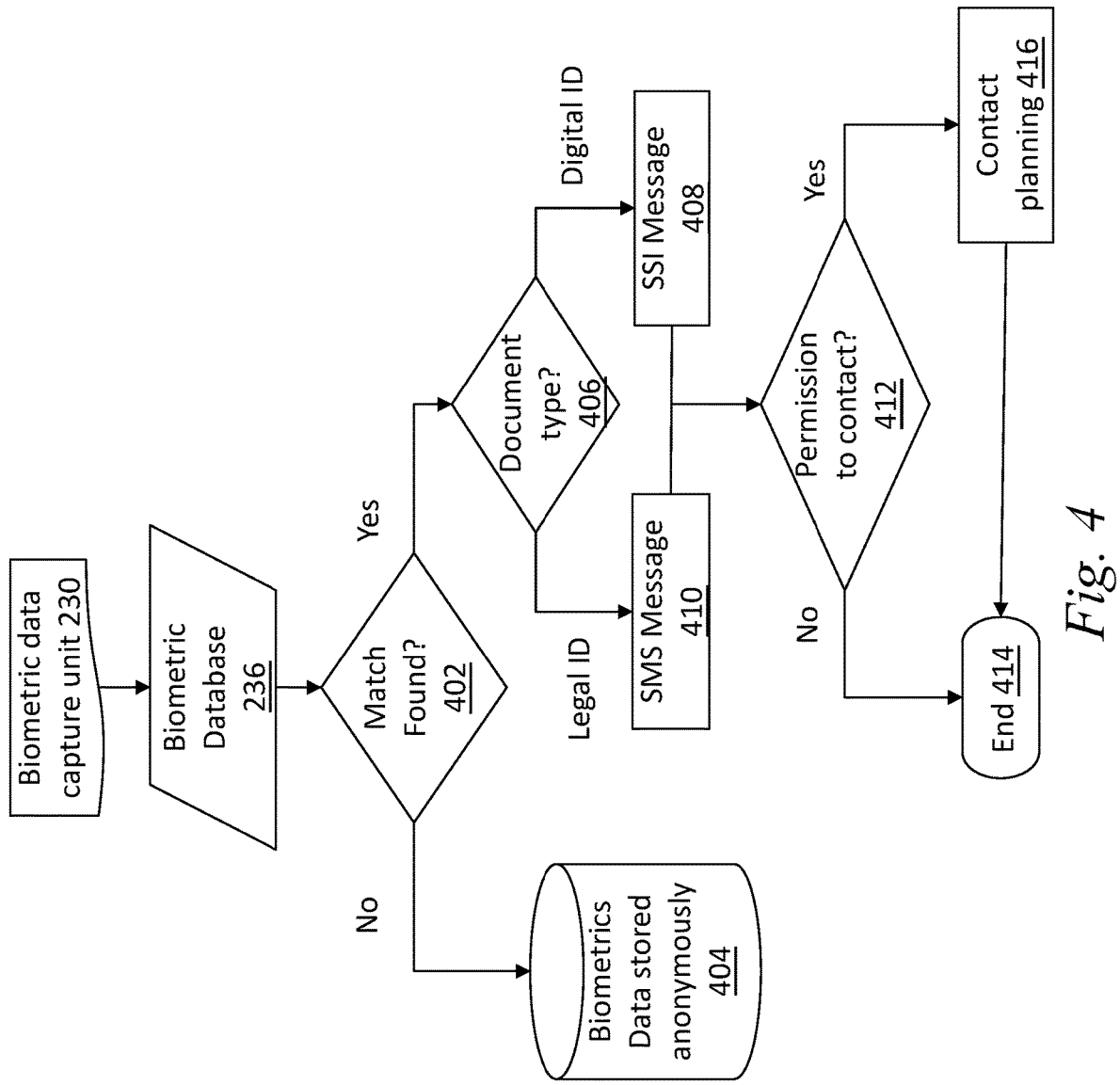
FIG. 4 describes an example of a process for allowing access to data accessing party to the digital identity of the user, according to some embodiments.

FIG. 4 describes an example process 400 for allowing access to data accessing party to the digital identity of the user, according to some embodiments. The process may involve components including capturing biometrics data, biometrics database, and communication modules.

In an example, upon capturing biometric data, overtly or covertly, of the user entering a space, data accessing party may determine, at step 402, whether the captured data is present in its biometric information database 250. According to one implementation, at step 404, if a match to the biometric data within biometric information database 250 cannot be made, then the captured biometric data may be recorded and stored as a new record in biometric information database 250. In an example, no identity information is stored in the new record. Along with the biometric data, associated auxiliary data, such as time of capture, location of capture, and the like may be stored in the new record.

In another example where it is determined at step 402 that captured biometric data is present in biometric information database 250, step 406 identifies the document type that was provided by the user for identification purpose along with the biometric data. If the identity document is identified as a decentralized identity, the data accessing party may establish the contact via SSI message, at step 408. If the identity document is identified as traditional identity data, the data accessing party may establish the contact via SMS message, at step 410. Other examples of forms of communication to establish the contact may include email, instant messaging, and direct mailing.

At step 412, the data accessing party requests permission to contact the user and for the user to provide contact details to the data accessing party. In some examples, data accessing party may list access conditions by which it will abide when using user's personal data while requesting access to user.

According to one example, the user may deny request, received from the data accessing party, to communicate with user. If the permission is denied, the data accessing party may not receive any contact information and may not communicate with user any further and reach the end of communication at step 414. However, according to another implementation, the user may accept the request, received from the data accessing party, to communicate with user. Upon acceptance from the user, at step 416, the data accessing party may continue with its communications plan with the user in accordance with agreed timescales, bounds of location and other conditions.

Figure 5:
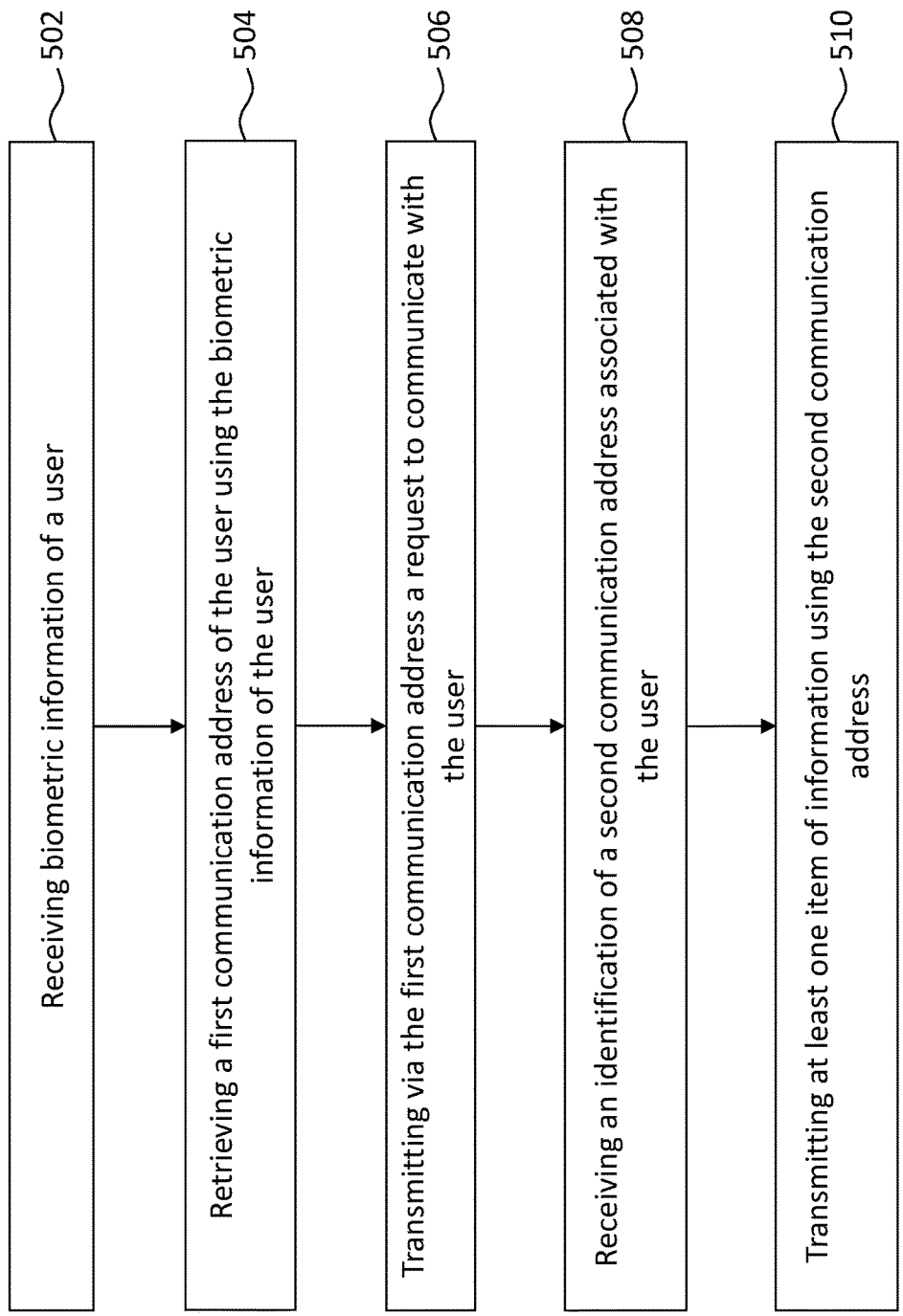
FIG. 5 depicts a flowchart for controlling access to a communications system, according to some embodiments.

FIG. 5 depicts flowchart 500 for controlling access to a communications system, according to some embodiments. In a brief overview of an implementation of flowchart 500, at step 502, biometric information of a user is received. At step 504, an address of a decentralized identity associated with the user is retrieved using the biometric information of the user. At step 506, a request to communicate with the user is transmitted by data accessing party via the first communication address of the user. At step 508, a second communication address of the user is received. At step 510, an item of information is transmitted via the second communication address.

Step 502 includes receiving, by a device, biometric information of a user. In implementations, biometric information of the user is captured by biometric data capture unit 230 or it may be retrieved from biometric information database 250. In an implementation, biometric information is received by data accessing party device 204.

Step 504 includes retrieving a first communication address of the user using the biometric information of the user. In an example, the first communication address of the user comprises a decentralized identity address. In another example, the first communication address of the user comprises a short message service (SMS) address. In an implementation, the first communication address is retrieved by data accessing party device 204.

Step 506 includes transmitting via the first communication address a request to communicate with the user. In an example, transmitting a request to communicate with the user comprises transmitting a self-sovereign identity (SSI) message via a decentralized identity address. In another example, transmitting a request to communicate with the user comprises transmitting a short message service (SMS) message via an SMS address. In an example, access conditions governing communication with the user may be provided. In an example, access conditions may be one or more of a timescale, a bounds of locations or incentives that will be provided to the user in exchange for a permission to communicate. In another examples, the identity of the data accessing party may be provided. In an implementation, the request to communicate with the user is transmitted by data accessing party device 204. In an implementation communication unit 242 transmits the request to communicate with the user.

Step 508 includes receiving an identification of a second communication address associated with the user. In examples, the second communication address may be one of at least a decentralized identity address, an email address, or a phone number. In another example, the second communication address may be that of a device configured to forward communications to the device associated with the user. In an example, a timescale during which the second communication address may be used may be provided. In another example, conditions on which use of the second communication address may be used may be provided. In an implementation, the identification of a second communication address associated with the user is received by data accessing party device 204. In an implementation, user device 202 is the device associated with the user. In an implementation, the device configured to forward communications may be communications forwarding device 210. In an implementation the second communication address may be stored in biometric information database 250 and associated with the biometric information of the user.

Step 510 includes transmitting at least one item of information using the second communication address. In an implementation, data accessing party device 204 transmits the at least one item of information.

Figure 6:
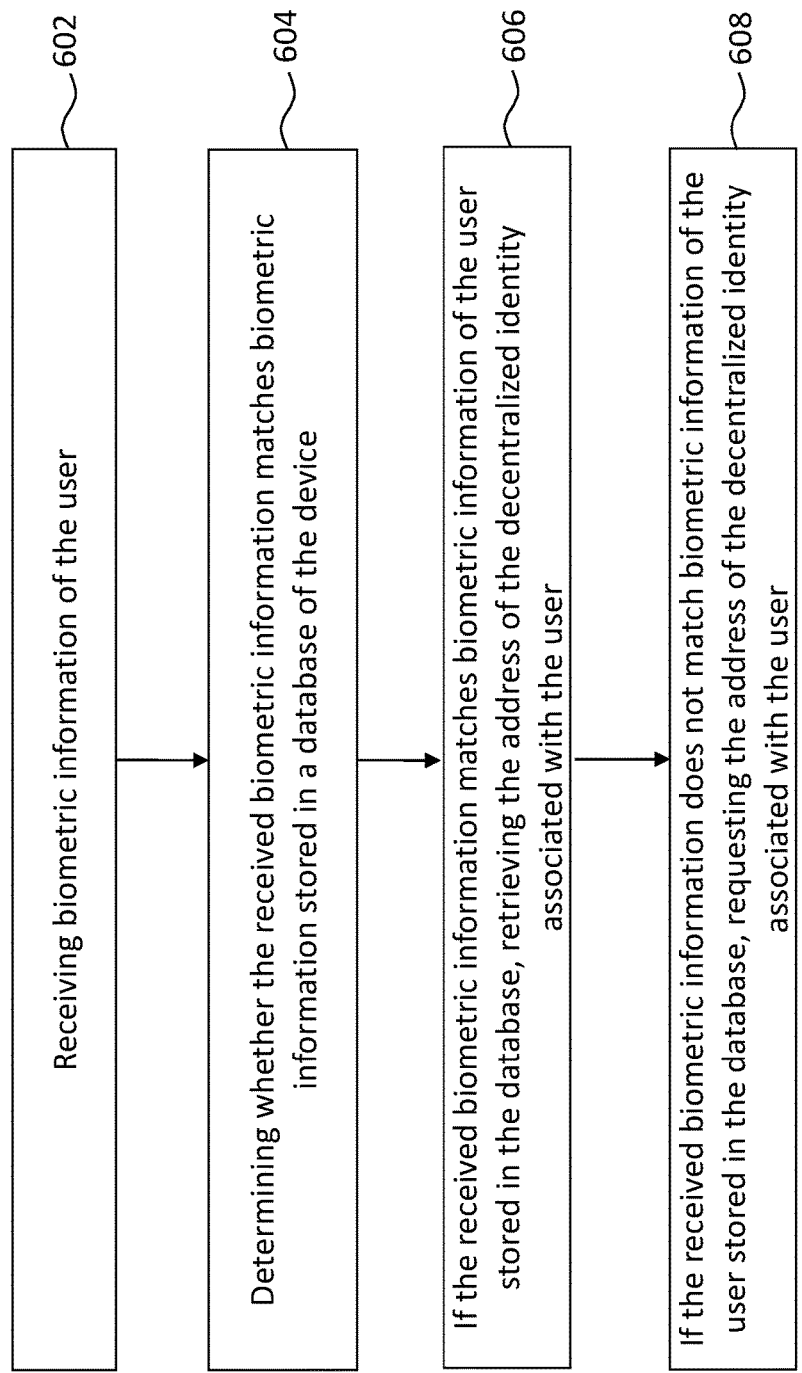
FIG. 6 depicts a flowchart for retrieval of biometric information, according to some embodiments.

FIG. 6 depicts flowchart 600 for retrieval of biometric information, according to some embodiments.

In brief overview of an implementation of flowchart 600, at step 602, biometric information of the user is received. At step 604, it is determined whether the received biometric information matches biometric information stored in a database. At step 606, the address of the decentralized identity associated with the user is retrieved if the received biometric information matches biometric information of the user stored in the database. At step 608, the address of the decentralized identity associated with the user is requested if the received biometric information does not match biometric information of the user stored in the database.

Step 602 includes receiving biometric information of the user. In an implementation, biometric information of the user may be received by data accessing party device 204, In an implementation, biometric information of the user may be captured by biometric data capture unit 230.

Step 604 includes determining whether the received biometric information matches biometric information stored in a database. In an implementation, received biometric information is compared with biometric information which may be stored in biometric information database 250. In an implementation, received biometric information may be compared by data accessing party device 204.

Step 606 includes retrieving the address of the decentralized identity associated with the user responsive to determining the received biometric information matches biometric information of the user in the database. In an implementation, if the received biometric information matches with the biometric information stored at the database, the address of the decentralized identity associated with the user is retrieved by data accessing party device 204. In an implementation, the biometric information of the user and the address of the decentralized identity associated with the user may be stored in biometric information database 250.

Step 608 includes requesting the address of the decentralized identity associated with the user, responsive to determining the received biometric information does not match any biometric information in the database. In an implementation, if the received biometric information does not match with the biometric information stored at the database, the address of the decentralized identity associated with the user is requested by data accessing party device 204. In some implementations, the received biometric information may not match the biometric information stored in the database. At such instances, the address of the decentralized identity may be requested from the user by data accessing party.

Figure 7:
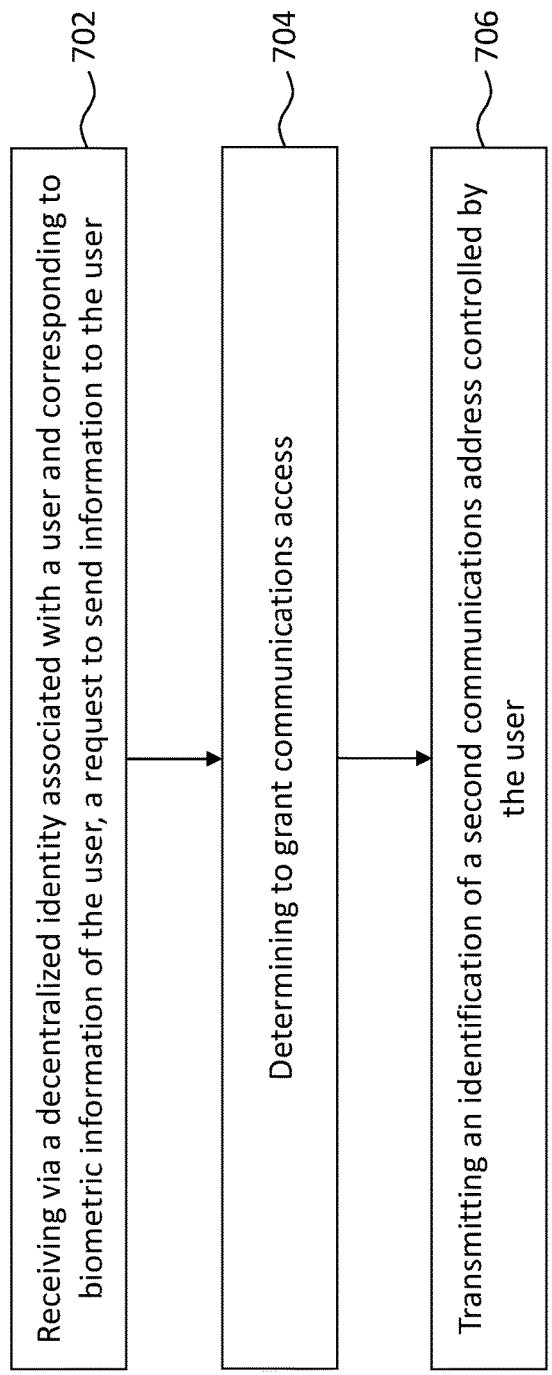
FIG. 7 depicts a flowchart for controlling access to information, according to some embodiments.

FIG. 7 depicts flowchart 700 for controlling access to information, according to some embodiments. In a brief overview of an implementation of flowchart 700, at step 702, a request to send information to a user is received via a decentralized identity that corresponds to the biometric information of the use. At step 704, a determination to grant access for communications is made. At step 706, an identification of a second communications address controlled by the user is transmitted.

Step 702 includes receiving via a decentralized identity associated with a user and corresponding to biometric information of the user, a request to send information to the user. In an example, the request to send information to the user may compromise at least one access condition. In an implementation, user device 202 may receive the request to send information to the user. In an implementation the decentralized identity associated with the user may be stored in centralized or distributed ledger 208. In an implementation biometric information of the user may be captured by biometric capture unit 230 or may be retrieved from biometric information database 250.

Step 704 includes determining to grant communications access. In an example, the determination to grant communications access may be based on the at least one access condition. In an implementation, user device 202 may grant communications access to a requesting device. In an implementation, communication access may be granted to data accessing party device 204.

Step 706 includes transmitting an identification of a second communications address controlled by the user. In an implementation, user device 202 may transmit the identification of the second communications address controlled by the user.

Figure 8:
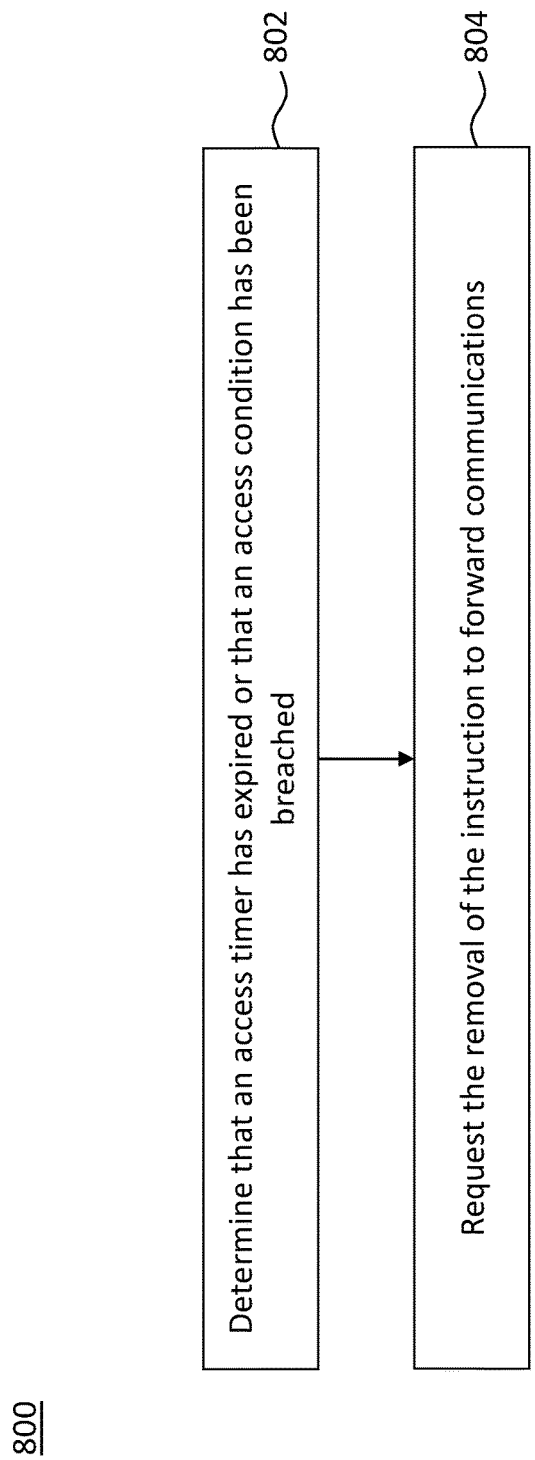
FIG. 8 depicts a flowchart for revoking access to a communications system, according to some embodiments.

FIG. 8 depicts flowchart 800 for revoking access to a communications system, according to some embodiments. In a brief overview of an implementation of flowchart 800, at step 802, a determination is made that an access timer has expired or that an access condition has been breached. At step 804, a request is made to remove the instruction to forward communications.

Step 802 includes determining that an access timer has expired or that an access condition has been breached. In an example, the access timer may be based on a calendar and a real-time clock. In another example, the access timer may be based on a number of messages. In an example, an access condition may be breached if a message is determined to be spam or if the content of a message is determined to be inappropriate. In an implementation, user device 202 may determine that the access timer has expired or that an access condition has been breached.

Step 804 includes making a request to remove the instruction to forward communications. In an implementation, user device 202 may make the request to remove the instruction to forward communications to communications forwarding device 210.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for controlled access to communications systems, comprising:

receiving, by a device, biometric information of a user;

retrieving, by the device using the biometric information of the user, a first communication address associated with the user;

transmitting, by the device via the first communication address, a request to communicate with the user; and receiving, by the device from a second device associated with the user, an identification of a second communication address controlled by the user;

wherein the device utilizes the second communication address to transmit at least one item of information to the second device associated with the user.

2. The method of claim 1, wherein the first communication address comprises a decentralized identity address.

3. The method of claim 2, wherein transmitting the request to communicate with the user further comprises transmitting a self-sovereign identity (SSI) message via the decentralized identity address.

4. The method of claim 1, wherein the first communication address comprises a short message service (SMS) address.

5. The method of claim 1, wherein the second communication address further comprises a decentralized identity address, an email address, or a phone number.

6. The method of claim 1, wherein the second communication address comprises an address of a third device configured to forward communications to the second device associated with the user.

7. The method of claim 6, wherein the third device is subsequently configured to stop forwarding communications to the second device associated with the user.

8. The method of claim 7, wherein receiving the identification of the second communication address further comprises receiving an identification of one of an access timer or an access condition; and wherein the third device is subsequently configured to stop forwarding communications to the second device responsive to expiration of the access timer or satisfaction of the access condition.

9. The method of claim 1, further comprising:
determining, by the device, whether the received biometric information matches biometric information stored in a database of the device; and either
retrieving the address of the decentralized identity associated with the user, by the device from the database, responsive to determining the received biometric information matches biometric information of the user in the database, or
requesting the address of the decentralized identity associated with the user, by the device from the second device, responsive to determining the received biometric information does not match any biometric information in the database.

10. The method of claim 1, wherein the request to communicate with the user comprises an identifier of the device or an entity associated with the device.

11. A system for accessing information, comprising:
a device comprising one or more processors and a communications interface, the one or more processors configured to:
receive biometric information of a user,
retrieve, using the biometric information of the user, a first communication address associated with the user,
transmit, via the communications interface using the first communication address, a request to communicate with the user, and
receive, via the communications interface from a second device associated with the user, an identification of a second communication address controlled by the user;
wherein the device utilizes the second communication address to transmit at least one item of information to the second device associated with the user.

12. The system of claim 11, wherein the first communication address comprises a decentralized identity address; and wherein the one or more processors are further configured to transmit a self-sovereign identity (SSI) message via the decentralized identity address.

13. The system of claim 11, wherein the first communication address comprises a short message service (SMS) address.

14. The system of claim 11, wherein the second communication address further comprises a decentralized identity address, an email address, or a phone number.

15. The system of claim 11, wherein the second communication address comprises an address of a third device configured to forward communications to the second device associated with the user.

16. The system of claim 15, wherein the third device is subsequently configured to stop forwarding communications to the second device associated with the user.

17. The system of claim 16, wherein the one or more processors are further configured to receive an identification of one of an access timer or an access condition with the identification of the second communication address; and wherein the third device is subsequently configured to stop forwarding communications to the second device responsive to expiration of the access timer or satisfaction of the access condition.

18. A non-transitory computer readable medium comprising instructions that, when executed by one or more processors of a computing device, cause the computing device to:
receive biometric information of a user;
retrieve, using the biometric information of the user, a first communication address associated with the user;
transmit, using the first communication address, a request to communicate with the user, and
receive, from a second device associated with the user, an identification of a second communication address controlled by the user;
wherein the computing device utilizes the second communication address to transmit at least one item of information to the second device associated with the user.

19. The computer readable medium of claim 18, wherein the first communication address comprises a decentralized identity address; and wherein execution of the instructions further causes the one or more processors to transmit a self-sovereign identity (SSI) message via the decentralized identity address.

20. The computer readable medium of claim 18, wherein the second communication address comprises an address of a third device configured to forward communications to the second device associated with the user.

* * * * *